United States Patent

[11] 3,548,086

[72] Inventors Wilhelmus Adrianus Van Gurp; Johannes Agterbosch; Roger Minczeles, Emmasingel, Eindhoven, Netherlands
[21] Appl. No. 776,593
[22] Filed Nov. 18, 1968
[45] Patented Dec. 15, 1970
[73] Assignee U. S. Philips Corporation New York, N.Y. a corporation of Delaware. by mesne assignment
[32] Priority Dec. 8, 1967
[33] Netherlands
[31] No. 6716769

[54] COLOUR SIGNAL SEPARATING ARRANGEMENT FOR A PAL-SECAM COLOUR TELEVISION RECEIVER
8 Claims, 5 Drawing Figs.

[52] U.S. Cl. 178/5.4
[51] Int. Cl. H04n 9/38, H04n 9/40, H04n 9/42
[50] Field of Search 178/5.4P, 5.4S

[56] References Cited

UNITED STATES PATENTS 3,283,066 11/1966 M. Sauvanet 178/5.4S
3,499,105 3/1970 D.S. Hobbs 178/5.4P

*Primary Examiner*—Richard Murray
*Assistant Examiner*—George G. Stellar
*Attorney*—Frank R. Trifari

ABSTRACT: A color switching system for a television receiver for the selective reception of PAL and SECAM signals featuring a combination circuit coupled to a balancing circuit through a PAL-SECAM switch. A delay line receives the color signal and applies it to the combination circuit. An alternate switching circuit receives the output of the balancing circuit so that it has at two output terminals the same color signals regardless of the modulation system used.

INVENTORS.
WILHELMUS A. J. VAN GURP
JOHANNES M. AGTERBOSCH
BY ROGER MINCZELES

Frank R. Trifari
AGENT

INVENTORS
WILHELMUS A. J. VAN GURP
JOHANNES M. AGTERBOSCH
BY ROGER MINCZELES

AGENT

INVENTORS.
WILHELMUS A. J. VAN GURP
JOHANNES M. AGTERBOSCH
ROGER MINCZELES
BY
AGENT

COLOUR SIGNAL SEPARATING ARRANGEMENT FOR A PAL-SECAM COLOUR TELEVISION RECEIVER

The invention relates to a colour signal separating arrangement for a multisystem colour television receiver including a system selector switch having at least a PAL position and a SECAM position for adapting the receiver to the nature of the colour signal to be handled, a delay circuit having at least an input and an output, a switching circuit and a combination circuit having at least a first input for applying an undelayed colour signal, a second input for applying a colour signal delayed by one line period, and two outputs.

Colour television receivers which must be suitable for handling a SECAM signal generally include a colour signal separating arrangement having a delay circuit to convert a line-sequential frequency-modulated SECAM colour signal into two simultaneously occurring frequency-modulated colour difference signals of a different kind.

Colour television receivers which must be suitable for handling a PAL signal often include a colour signal separating arrangement including a delay circuit in order to obtain a phase error compensation. With the aid thereof the colour signal alternately turning left and right and modulated in quadrature on a subcarrier is converted into the two quadrature components each associated with a different colour signal component.

For a colour television receiver which must at least be suitable for handling both a PAL and a SECAM signal the object of the invention is to provide a colour signal separating arrangement which permits an economic use of switching elements.

According to the invention a colour signal separating arrangement of the kind described in the preamble is characterized in that it includes a balancing circuit having at least one input and two outputs, while the switching circuit includes two inputs each line period the polarity of the voltages at which is connected to a different output of the balancing circuit, two outputs and two switching members for alternately connecting directly and crosswise each of the two inputs to a different one of the two outputs of the switching circuit, the input of the delay circuit being connectable through a switching element of the system selector switch in the PAL position to the said first input of the combination circuit, the output of the delay circuit being connected to the said second input of the combination circuit and a first output of the combination circuit, from which in the PAL position a colour signal component alternating 180° in phase from line to line can be derived, being connected to the said input of the balancing circuit.

The invention is based on the recognition of the fact that when using a balancing circuit one input thereof may remain permanently connected to one of the outputs of the combination circuit and the outputs thereof may be connected to the inputs of the switching circuit. This switching circuit may then be used for reception of both PAL and SECAM signals without additional switching elements being required therefor. As a result the number of switching elements of both the system selector switch and of the switching circuit can be limited so that an economic setup of a colour signal separating arrangement can be obtained.

In order that the invention may be readily carried into effect it will now be described in detail by way of example with reference to the accompanying diagrammatic drawings in which.

Figure 4:
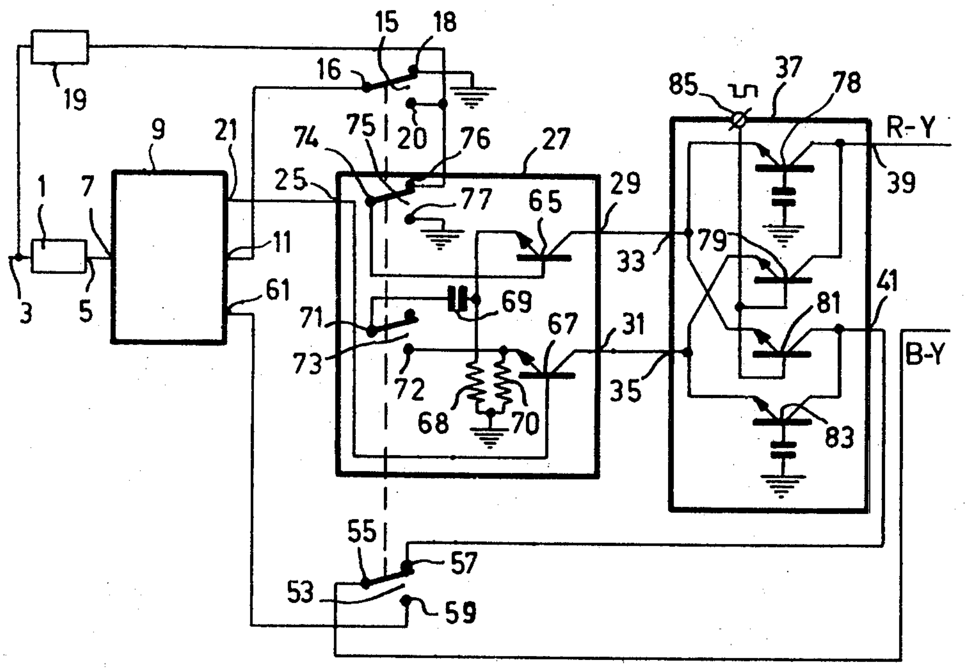
Figure 5:
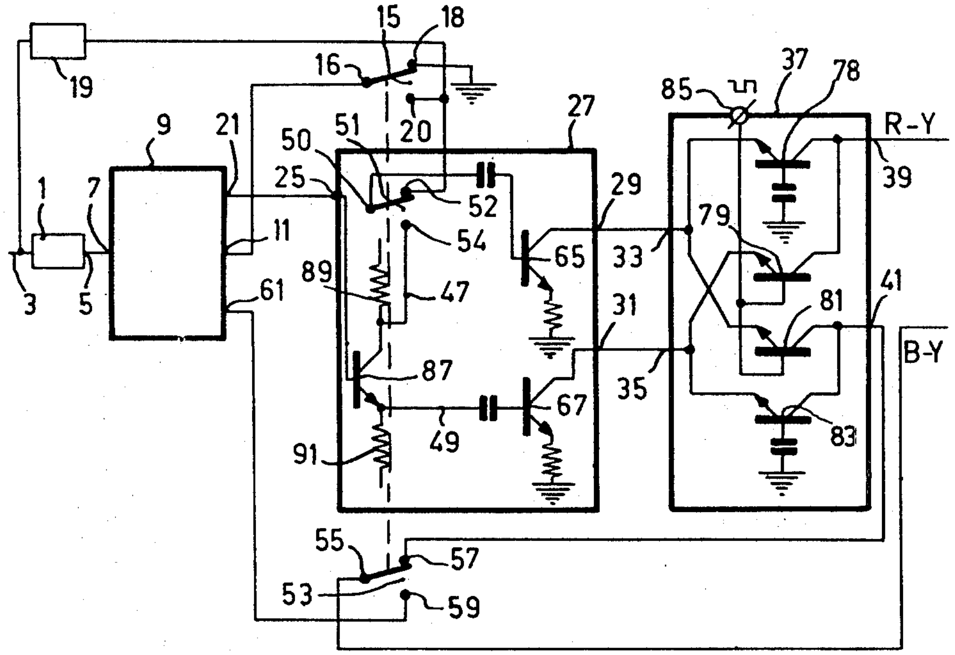

FIG. 4 shows an embodiment of a colour signal separating arrangement according to the invention in which both the balancing circuit and the switching circuit are equipped with transistors which may be included in an integrated circuit; and FIG. 5 shows a further embodiment of a signal separating arrangement according to the invention in which both the balancing circuit and the switching circuit are equipped with transistors which may be included in an integrated circuit.

Figure 1:
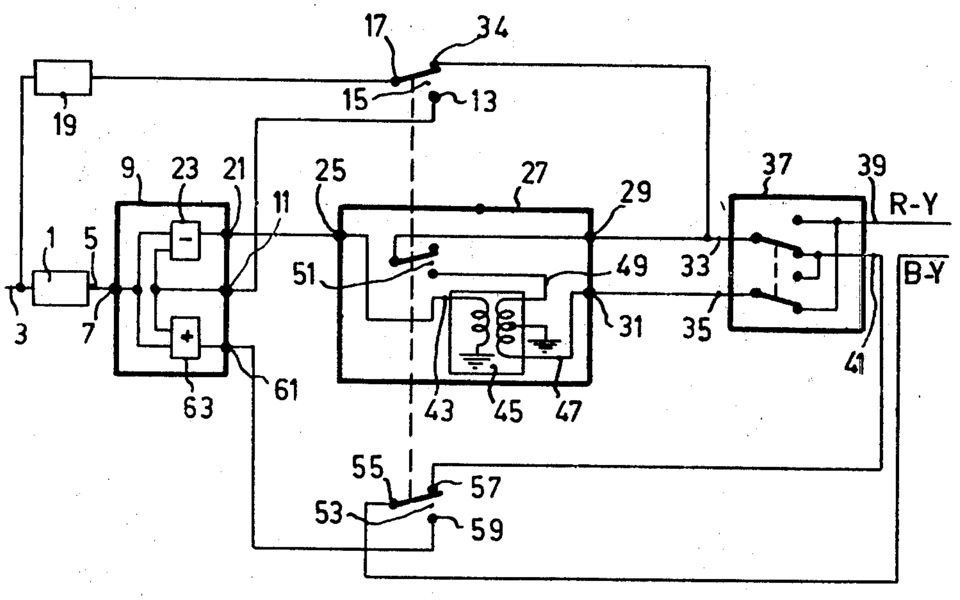
FIG. 1 shows an embodiment of a colour signal separating arrangement according to the invention including a delay circuit having an unbalanced output.

In FIG. 1 a delay circuit 1 having a delay of one line period has an input 3 which is also the input of the colour signal separating arrangement. According to the invention an output 5 of the delay circuit 1 is connected to an input 7 of a combination circuit 9. The input 7 is called second input. The combination circuit 9 furthermore has an input 11 which is called first input. According to the invention the first input 11 is coupled to a connection 13 of a switching element 15 of a system selector switch having three switching elements 15, 51, 53. A connection 17 of the switching element 15 is connected through an attenuation circuit 19 to the input 3 of the delay circuit 1. According to the invention the first input 11 of the combination circuit is thus connected to the input 3 of the delay circuit in the PAL position (not shown) of the system selector switch. This connection includes the attenuation circuit 19 having the same attenuation as that of the delay circuit 1.

The combination circuit 9 has a first output 21 of a subtractor circuit 23 included therein. According to the invention the first output 21 is connected to an input 25 of a balancing circuit 27.

The balancing circuit 27 furthermore has two outputs 29 and 31 which, according to the invention, are connected to an input 33 and an input 35, respectively, of a switching circuit 37. Furthermore the input 33 is coupled to a connection 34 of the switching element 15 of the system selector switch.

The switching circuit 37 has two outputs 39 and 41. The output 39 is also an output of the colour signal separating arrangement. Both when handling a SECAM signal and a PAL signal a colour signal component of a certain kind, as will be described hereinafter, continuously appears at the output 39. In the now usual modulation standards this is the red colour difference signal (R-Y).

According to a further elaboration of the invention the input 25 of the balancing circuit 27 is connected to an input 43 of a transformer 45 functioning as a balancing member. The transformer 45 has two outputs 47 and 49 which are balanced relative to earth and at which a voltage applied through the input 43 produces two voltages in phase opposition relative to earth. The output 47 is connected to the output 31 of the balancing circuit 27. The output 49 is connected through the switching element 51 of the system selector switch to the output 29 of the balancing circuit. This switching element 51 forms a through-connection in the PAL position and an interruption in the SECAM position.

The third switching element 53 of the system selector switch has three connections 55, 57 and 59. The connection 55, which is also an output of the colour signal separating arrangement, is therefore connected through the connection 57 to the output 41 of the switching circuit 37 in the SECAM position of the system selector switch and is connected, in the PAL position, through the connection 59 to a second output 61 of the combination circuit 9 which is the output of an adder circuit 63.

The operation of the colour signal separating arrangement is as follows.

When receiving a PAL signal two colour signals modulated in quadrature on a subcarrier, for example, a red (R-Y) and a blue colour difference signal (B-Y) are applied to the input 3, the phase of one of the quadrature components, for example, (R-Y) changing 180° from line to line.

When receiving a SECAM signal a subcarrier is applied to the input 3 which subcarrier is modulated in frequency by a red (R-Y) colour difference signal alternately during one line period and by a blue colour difference signal (B-Y) during the following line period. Dependent on the position of the system selector switch the signal applied to the input 3 of the colour signal separating arrangement follows a different path. The position shown of the system selector switch is the SECAM position. In this SECAM position the input 3 is connected through the attenuation circuit 19, the connections 17 and 34 of the switching element 15 to the input 33 of the switching circuit 37. The input 33 thus receives an undelayed signal.

Furthermore the input 3 is connected to the input 35 OF THE switching circuit 37 through the delay circuit 1, the output 5 thereof, the input 7 of the combination circuit 9, the first output 21 thereof, the input 25 of the balancing circuit 27, the input 45 of the balancing transformer 45, the output 47 of this transformer and the output 31 of the balancing circuit 27. Along this path the input 35 receives a signal which is delayed by one line period relative to that at the input 33.

The output 41 of the switching circuit 37 is connected through the connection 57 of the switching element 53 to the connection 55 which also forms the other output of the signal separating arrangement.

The switching circuit 37 alternately connects its input 33 to its output 41 and its input 35 to its output 39 during one line period and connects its input 33 to its output 39 and its input 35 to its output 41 during the following line period.

A signal which is alternately undelayed and delayed by one line period and originates from the input 3 then becomes available at the output 55 connected to the output 41. At the same time a signal which is alternately delayed and undelayed and originates from the input 3 appears at the output 39. By a correct switching of the switching circuit 37 which is checked with the aid of an identification signal present in a SECAM signal the red colour difference signal (R-Y) can continuously be obtained at the output 39 and the blue colour difference signal (B-Y) can continuously be obtained at the output 55.

When receiving a PAL signal the system selector switch is set in the position not shown. The input 3 is then connected to the first input 11 of the combination circuit 9 through the attenuation circuit 19 and the connections 17 and 13 of the switching element 15. The input 11 thus receives an undelayed PAL signal. The input 3 is furthermore connected through the delay circuit 1 and the output 5 thereof to the second input 7 of the combination circuit 9. The second input 7 thus receives the PAL signal which is delayed by one line period relative to that at the input 11. A difference signal is obtained from the delayed and the undelayed signal at the output 21 of the subtractor circuit 23 and a sum signal is obtained at the output 61 of the adder circuit 63. The difference signal is the quadrature component having the alternating phase from the PAL signal, for example, the red (R-Y) colour difference signal and the sum signal is the quadrature component having the constant phase, for example, the blue (B-Y) colour difference signal.

The red colour difference signal is led from the output 21 through the input 25 of the balancing circuit 27 to the input 43 of the balancing transformer 45. The balancing transformer 45 has a secondary the middle tapping of which is connected to earth. As a result the red colour difference signal appears in phase opposition during each line period at the outputs 47 and 49 of this secondary. In addition the phase of the red colour difference signal is reversed line by line at the outputs 47 and 49. A red colour difference signal is applied from the output 47 through the output 31 to the input 35 of the switching circuit 37. A red colour difference signal having a phase which is always opposite to that at the output 47 is applied from the output 49 through the then closed switching element 51 and the output 29 to the other input 33 of the switching circuit 37.

The phase of the red colour difference signal is reversed line by line at each of these inputs 33 and 35 but is opposite during each line period relative to that at the other input. During one line period the phase of the input 33 is thus the same as during the following line period at the input 35.

The input 33 is further not connected due to the interrupted connection of the switching element 15. The output 41 is likewise disconnected due to the interrupted connection of the switching element 53. The output 39 is connected in the switching circuit 37 to the input 35 during one line period (position shown) and to the input 33 during the following line period (position not shown).

Hence the output 39 is connected every time to an input of the switching circuit 37 at which a red colour difference signal of the same phase occurs. In the PAL position of the system selector switch a red colour difference signal having a nonalternating phase can thus be obtained at the output 39 of the switching circuit 37.

The correct switching of the switching circuit 37 is effected in the PAL position while checked by an identification signal present in a PAL signal.

The sum signal of the undelayed PAL signal applied through the first input 11 and the delayed PAL signal applied through the second input 7 is produced at the output 61 of the adder circuit 63. As already noted this sum signal yields the quadrature component having the nonalternating phase, for example, the blue colour difference signal (B-Y). This (B-Y) signal thus directly becomes available at the output of the colour difference signal separating arrangement through the connections 59 and 55 of the switching element 53.

By maintaining the signal path from the output 5 of the delay circuit through the subtractor circuit 23, the output 21, the input 25, the input 43 of the balancing transformer 45, the output 47, the output 31 to the input 35 of the switching circuit 37 for handling both a PAL and a SECAM system according to the invention, this switching circuit 37 can be used in both cases which yields a saving of both an additional switching element for use with PAL signal handling and a saving of switching elements on the system selector switch.

Figure 2:
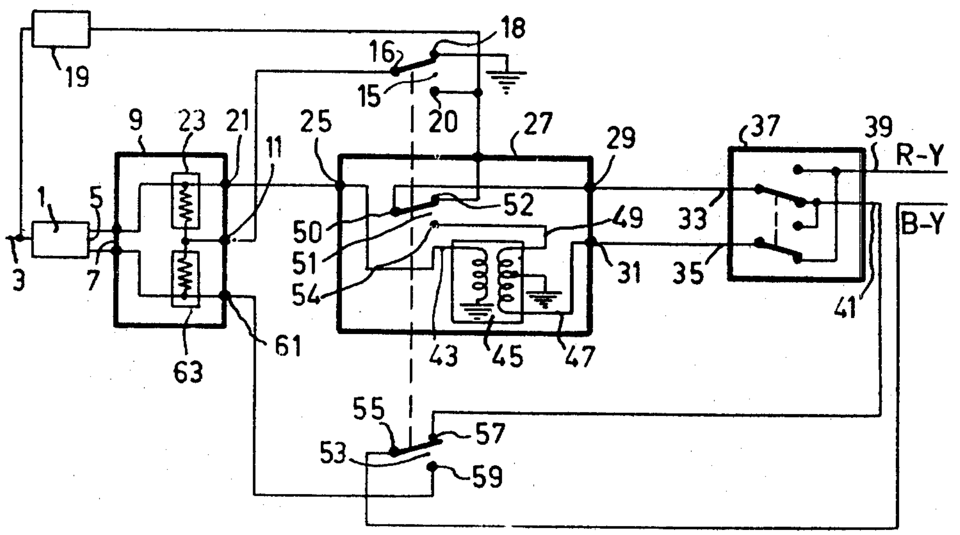
FIG. 2 shows a further embodiment of a colour signal separating arrangement according to the invention in which the output of the delay circuit is of the balanced type.

In FIG. 2 corresponding components have the same reference numerals as those in FIG. 1. The differences from FIG. 1 are the following. The output 5 of the delay circuit and the input 7 of the combination circuit 9 are of a balanced construction. As a result the circuits 23 and 63 both have actually become adder circuits while yet on the reception of a PAL signal the same signals appear at the outputs 21 and 61 as those in FIG. 1, for example the quadrature component (R-Y) phase alternating line by line at the output 21 and the quadrature component (B-Y) which always has the same phase at the output 61. Furthermore the switching elements 15 and 51 of the system selector switch are included in the circuit in a slightly different manner. The switching element 15 has three connections 16, 18 and 20. The connection 16 is connected to the first input 11 of the combination circuit 9. In the SECAM position of the system selector switch the input 11 is connected to earth through the connections 16 and 18 so that no undelayed signal is applied to the combination circuit 9.

In the PAL position the input 11 is interconnected through the connections 16 and 20 of the switching element 15 and the attenuator 19 to the input 3 so that an undelayed signal is applied to the input 11. The switching element 51 of the system selector switch has three connections 50, 52 and 54. The connection 50 is connected to the input 33 of the switching circuit 37 through the output 29 of the balancing circuit 27. As a result the input 33 is interconnected in the PAL position of the system selector switch through the connections 50 and 54 to the output 49 of the balancing transformer 45.

In the SECAM position the input 33 is connected through the connections 50 and 52 and the attenuator 19 to the input 3 so that an undelayed signal is passed on to the input 33.

The operation of this embodiment is further identical to that of the embodiment of FIG. 1 so that this FIG. is further referred to.

Although this embodiment includes a delay circuit and a combination circuit having a balanced output and second input, respectively, the delay circuit and the combination circuit having an unbalanced output and a second input, respectively, can alternatively be used. The circuit of the switching elements 15 and 51 of the system selector switch may then remain the same as is shown in the embodiment of FIG. 2, unless a different type of balancing circuit 27 is used. An Example thereof will be given in the embodiment of FIG. 4.

Figure 3:
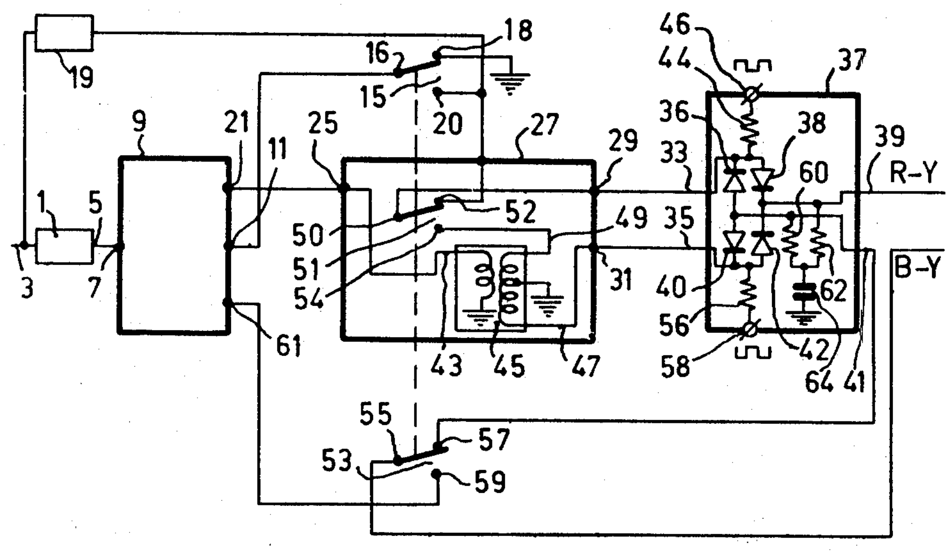
FIG. 3 shows an embodiment of a colour signal separating arrangement according to the invention in which the switching circuit is equipped with diodes.

FIG. 3 illustrates how a switching circuit 37 is constructed with four diodes can be included in the circuit. The remainder of the circuit has the same reference numerals as in the previous FIG. to which reference is made for the description of its operation. The adder and subtractor circuit 9 may be of the type having a balanced second input 7 as was shown in FIG. 2 or of the type having an unbalanced second input 7 as was shown in FIG. 1.

The switching circuit 37 includes four diodes 36, 38, 40 and 42. The anodes of the diodes 36 and 40 are connected together, to the output 41 and to a resistor 60. The other end of the resistor 60 is connected to earth through a large capacitor 64. The cathodes of the diodes 38 and 42 are connected together, to the output 39 and to a resistor 62. The other end of the resistor 62 is likewise connected to earth through the large capacitor 64. The cathode of the diode 36 is connected to the anode of the diode 38, to the input 33 and to an input 46 of the switching circuit 37 through a resistor 44.

The cathode of the diode 40 is connected to the anode of the diode 42, the input 35 and to an input 58 of the switching circuit 37 through a resistor 56.

Square-wave voltages of opposite polarities and of half the line frequency are applied to the inputs 46 and 58.

The operation of the switching circuit 37 of half the line frequency is as follows.

If the input 46 is positive and the input 58 is negative during one line period the diodes 38 and 40 are conducting. The input 33 is then connected to the output 39 through the diode 38 and the input 35 is connected to the output 41 through the diode 40. During the following line period tje polarity of the voltages at the inputs 46 and 58 has changed and the diodes 36 and 42 are conducting. The input 33 is then connected to the output 41 through the diode 36 and the input 35 is connected to the output 39 through the diode 42.

Although in the embodiments of FIGS. 1 to 3 a transformer is shown as a balancing member 45 it will be evident that, for example, a circuit having an active element as a balancing member can alternatively be used. A load impedance is then incorporated in two electrode supply lines of this active element, one control electrode of which must be connected to the input 43 of the balancing member. These load impedances must be switched in such manner that upon control of the active element the same voltages are produced in phase opposition which voltages are applied to the outputs 47 and 49 of the balancing member.

Such a circuit of a balancing member having an active element is, for example, a circuit including a transitor the base of which is connected to the input 43 while the collector and the emitter are connected to outputs 47 and 49, respectively, and in which the emitter line and the collector line include substantially equal load impedances.

In the embodiment of FIG. 4 the switching circuit 37 and the balancing circuit 27 are constructed in a manner different from that in the other embodiments. The remaining components may be the same as corresponding components of a previous embodiment and have the same reference numerals. For the description of the operation thereof reference is made to said embodiments.

The balancing circuit 27 includes two transistors 65 and 67. The collector of the transistor 65 is connected to the output 29 and that of the transistor 67 is connected to the output 31.The emitter of the transistor 65 is connected to earth through a resistor 68 and to a connection 71 of a switching element 73 of the system selector switch through a capacitor 69. The emitter of the transistor 67 is connected to earth through a resistor 70 and is furthermore connected to a connection 72 of the switching element 73.

In the PAL position of the system selector switch the emitters are first connected together with respect to AC voltage and are disconnected in the SECAM position.

The base of the transistor 67 is connected to the input 25 of the balancing circuit. The base of the transistor 65 is coupled to a connection 74 of a switching element 75 of the system selector switch. A connection 76 of this element is connected through the attenuator 19 to the input 3 of the circuit. A connection 77 of the switching elements 75 is connected to earth. As a result the undelayed signal is applied to the base of the transistor 65 in the SECAM position through the connections 74 and 76 and is connected to earth through the connections 74 and 77 in the PAL position.

The operation of the balancing circuit 27 described is as follows.

In the PAL position (not shown) of the system selector switch only the transistor 67 is controlled through the input 25 by a red colour difference signal which is reversed in phase from line to line. As a result of the coupling of the emitters through the capacitor 69 and the connection 74, 77 of the base of the transistor 65 to earth the transistors operate as self-balancing colour difference signal current sources of opposite polarity for the outputs 29 and 31. In the SECAM position (shown) of the system selector switch the delayed signal is applied through the input 25 to the base of the transistor 67. The transistor 67 then operates as a current source which applies a delayed SECAM signal to the output 31. An undelayed signal obtained from the input 3 through the attenuator 19 is obtained at the base of the transistor 65 through the connections 74, 76 of the switching element 75. The transistor 65 thus operates as a current source which applies an undelayed SECAM signal to the output 29.

The switching circuit 37 includes four transistors 78, 79, 81 and 83 the collectors of which serving as outputs are interconnected pairwise. The collector of the transistor 78 is interconnected to that of the transistor 79 and the collector of the transistor 81 is interconnected to that of the transistor 83. A base serving as a first input of each pair of transistors 78, 79 and 81, 83 is connected to earth with respect to AC voltage; this is the case with the base of the transistor 78 and with that of the transistor 83. The bases of the further transistors 79 and 81 which serve as first inputs are connected together and connected to an input 85 of the switching circuit 37. A square-wave voltage of half the line frequency is applied to the input 85. Of one pair of transistors 78, 79 and emitter serving as a second input of the transistor 78, the base of which is connected to earth, is interconnected to the emitter of that of the transistor 81 of the other pair 81, 83 the base of which receives the square-wave voltage of half the line frequency. The emitter of the transistor 83 is likewise interconnected to that of the transistor 79. The interconnected emitters of the transistors 78, 81 are connected to the input 33, those of the transistors 79, 83 to the input 35 of the switching circuit 37. The transistors 78, 79, 81 and 83 are provided with supply and bias voltages in a usual manner which has not been described for the sake of clarity.

The operation of the switching circuit 37 is as follows. The inputs 33 and 35 which are connected to collectors of the transistors 65 and 67 serving as current sources are fed by these transistors by means of a current which in the SECAM position of the system selector switch represents an undelayed and a delayed SECAM signal, respectively, and in the PAL position represents the red colour difference signal in two phases differing by 180° for each line period. Since the red colour difference signal derived from the output 21 is again reversed 180° from line to line this means that in the phase of the red colour difference signal one line at the output 31 is the same as the other line at the output 29.

If the square-wave voltage of half the line frequency which is applied to the input 85 has a positive-going value the currents supplied to the inputs 33 and 35, respectively, are led through the transistors 81 and 79, respectively, to the outputs 41 and 39, respectively. The transistors 78 and 83 then do not convey collector currents. For a negative-going value of the square-wave voltage at the input 85 the transistors 79 and 81 are cut off and the currents supplied though the inputs 33 and 35, respectively, are passed on to the outputs 39 and 41, respectively, through the transistors 78 and 83 which are then conducting.

The circuit of the transistors in the balancing circuit 27 and in the switching circuit 37 of this example is satisfactorily suitable for incorporation in an integrated circuit.

In the embodiment of FIG. 5 the switching elements 73 and 75 of the system selector switch of FIG. 4 are substituted for one switching element 51 only which is switched in the same manner as is shown in FIGS. 2 and 3.

The circuit including the transistors 65 and 67 is not self-balancing in the PAL position of the system selector switch in contrast with that of FIG. 4. A separate balancing member has been used to control the two transistors 65 and 67 in phase opposition. A circuit including a transistor 87 is provided as a balancing member. This transistor 87 is provided with two substantially identical load impedances 89 and 91 in the collector and emitter and its base is connected to the input 25 of the balancing circuit 27. The connection 54 of the switching element 51 of the system selector switch is connected to the collector output 47 of the transistor 87. The emitter output 49 of the transistor 87 is connected to the base of the transistor 67. The base of the transistor 65 is connected to the connection 50 of the switching element 51. The switching element 51 has the same function as in the embodiments of FIGS. 2 and 3 so that for its operation reference is made to the relevant description.

The transistors 65, 67 and 87 are provided with supply and bias voltages in, for example, known manner which is further not described for the sake of clarity.

The operation of the balancing circuit is as follows.

In the SECAM position (shown) of the system selector switch an undelayed SECAM signal is applied to the base of the transistor 65 through the connections 52 and 50 of the element 51 of the system selector switch. The base of the transistor 67 then receives a SECAM signal from the output 49 of the balancing transistor 87 which signal is delayed by one line period and is applied through the base of said balancing transistor.

In the PAL position (not shown) of the system selector switch the base of the transistor 65 receives a red colour difference signal originating from the output 47 of the balancing transistor 87 through the connections 50 and 54 of the switching element 51. A red colour difference signal which relative to that at the output 47 is shifted 180° in phase and which appears at the output 49 of the transistor 87 is applied to the base of the transistor 67.

The transistors 65 and 67 serve as current sources for the switching circuit 37. For the operation of the switching circuit 37 reference is made to the description of FIG. 4, for the operation of the remainder of the circuit reference is made to the descriptions of FIGS. 1 to 3 in which corresponding components have the same reference numerals.

Also the circuit including the transistors in the balancing circuit 27 and the switching circuit 37 of the embodiment of FIG. 5 is satisfactorily suitable for incorporation in an integrated circuit.

In the described embodiments the system selector switch may be, for example, a switch which can be manually operated or an automatically switching relay.

Although the embodiments of FIGS. 4 and 5 use transistors as active elements it will be evident that different suitable types of active elements may alternatively be used.

The transistors of the switching circuits 37 of FIGS. 4 and 5 may of course alternatively be operated with the aid of two square-wave voltages applied in opposite phase. The bases of the transistors 78 and 83 may then be interconnected and controlled with the aid of a square-wave voltage in opposite phase to that at the input 85.

We claim:

1. A colour signal separating arrangement for a multisystem colour television receiver including: a system selector switch having at least a PAL position and a SECAM position and having at least two switching elements for adapting the reciever to the nature of the colour signal to be handled; a delay circuit having at least an input and an output; a switching circuit and a combination circuit having at least a first input for applying an undelayed colour signal; a second input for applying a colour signal which is delayed by one line period; and two outputs, characterized in that the colour signal separating arrangement includes a balancing circuit having at least one input connected to a first output of the combination circuit and two outputs, while the switching circuit includes: two inputs each of which is connected to a different output of the balancing circuit; two outputs and two switching members for alternately connecting directly and crosswise each of the two inputs to a different one of two outputs of the switching circuit, the input of the delay circuit to which the colour signal is applied being connectable through a first switching element of the system selector switch in the PAL position to the said first input of the combination circuit while in the SECAM position the input is ultimately connectable to the first input of the switching circuit; the output of the delay circuit being connected to the said second input of the combination circuit, the second output of the combination circuit being connectable through a second switching element of the system selector switch to provide an output in the PAL position, the first output of the switching circuit provides a system output while the second output of the switching circuit is connectable through the second switching element in the SECAM position to provide a second system output for colour difference signal.

2. A colour signal separating arrangement as claimed in claim 1, characterized in that an attenuation circuit, the attenuation of which is substantially equal to that of the delay circuit is included in the connection between the input of the delay circuit and the first switching element of the system selector switch.

3. A colour signal separating arrangement as claimed in claim 1, characterized in that the balancing circuit comprises a circuit including two active elements each having an input and an output, each output of the active elements being connected to a different one of the said outputs of the balancing circuit and an input of one active element being connected to the said input of the balancing circuit while the input of the other active element can be connected to earth through the first switching element of the system selector switch in the PAL position and can be connected to the said input of the delay circuit in the SECAM position, while furthermore a coupling between the two active elements can be switched on with the aid of a further switching element of the system selector switch in the PAL position.

4. A colour signal separating arrangement as claimed in claim 1, characterized in that the balancing circuit includes a balancing member having an input and two outputs which are balanced with respect to earth one output of which is connected to the second input of the switching circuit while the other output of the balancing circuit can be connected to the other output of the balancing member with the aid of an element of the system selector switch in the PAL position and to the input of the delay circuit in the SECAM position with the aid of the first switching member.

5. A colour signal separating arrangement as claimed in claim 4, characterized in that the balancing member comprises an active element including a load impedance in two electrode lines thereof, a control electrode of said active element being the input and the connections of the load impedances to the corresponding electrodes being the outputs, the balancing circuit comprising two further active elements each having an input and an output of which a control electrode of one active element can be connected through the first switching element of the system selector switch to the input of a delay circuit in the SECAM position, and to the connection of one of the said load impedances and the corresponding electrode in the PAL position, while a control electrode of the other of the two active elements is connected to the connection of the other said load impedance and the corresponding electrode, while furthermore the outputs of the two active elements are each connected to a different one of the outputs of the balancing circuit.

6. A colour signal separating arrangement as claimed in claim 1, characterized in that the switching circuit includes four active elements each having a first and a second input and an output, the outputs of the active elements being connected pairwise to a different one of the outputs of the switching circuit and a first input of an active element of each pair being connected to earth with respect to AC voltage, the other first input being connected with respect to AC voltage to an input of the switching circuit to which a square-wave voltage of half the line frequency is applied, and a second input of an active element, the first input of which is earthed, of one pair being connected to a second input of an active element the first input of which is connected to the input for the square-wave voltage of half the line frequency of the other pair and to a said input of the switching circuit.

7. A colour signal separating arrangement as claimed in claim 6, characterized in that the active elements are semiconductor elements.

8. A colour signal separating arrangement as claimed in claim 7, characterized in that the semiconductor elements are included in an integrated circuit.